Nov. 17, 1970 R. J. SOCCI 3,541,460

APPARATUS FOR INSERTING A SEMICONDUCTOR ELEMENT IN A WAVEGUIDE

Filed April 3, 1967 2 Sheets-Sheet 1

INVENTOR.
ROBERT J. SOCCI

BY R. J. Frank
ATTORNEY.

INVENTOR.
ROBERT J. SOCCI
BY R. J. Frank
ATTORNEY.

United States Patent Office 3,541,460

Patented Nov. 17, 1970

3,541,460

APPARATUS FOR INSERTING A SEMICONDUCTOR ELEMENT IN A WAVEGUIDE

Robert J. Socci, Yonkers, N.Y., assignor to General Telephone & Electronics Laboratories, Incorporated, a corporation of Delaware Filed Apr. 3, 1967, Ser. No. 627,841
Int. Cl. H03d *9/02;* H01p *1/00*
U.S. Cl. 329—161 7 Claims

ABSTRACT OF THE DISCLOSURE

A holder for a semiconductor element which is adapted for insertion into a transverse plane of a waveguide. The semiconductor element is coupled to a section of slab-line formed by the holder and the adjacent waveguide wall thereby enabling the electrical connection for the holder to be impedance matched with the external circuit.

BACKGROUND OF THE INVENTION

This invention relates to a semiconductor element holder adapted for insertion into a waveguide.

The use of semiconductor elements to vary and control the characteristics of electromagnetic waves is becoming increasingly widespread due in part to the increased commercial interest in high frequency electromagnetic waves. Generally, the elements are mounted across an aperture in a thin slab-like holder which is adapted for insertion into a transverse plane of a waveguide. A device of this type is described in U.S. Pat. 2,871,353 issued Jan. 27, 1959 to H. T. Friis et al.

Typical of the operations performed by these semiconductor elements are the modulation of a guided electromagnetic carrier wave by the application of a signal to the element and the mixing of two guided waves with the resultant sum or difference signal being extracted from the element. At present, the useable carrier frequency range extends well into the millimeter wavelength region, i.e. frequencies above 30 kmc., and the desired signal frequencies for modulation and mixing applications can be of the order of 5 kmc.

Typically, the holder provides an external connection for the semiconductor element by incorporating a section of co-axial line therein. The center conductor of this line is adapted to mate with a coaxial transmission line which is connected to the external circuit. The slab-like holder is required to be relatively thin, less than one-half wavelength at the frequency of operation, in order to minimize the losses due to the insertion of the holder in the waveguide. This limitation on holder thickness places a restriction on the dimensions of the section of coaxial line formed therein. This is due to the fact that the coaxial section extends parallel to the long dimension of the holder and emerges at the thin end.

Consequently, the impedance of the coaxial section is substantially lower than the impedance of the external transmission line. This impedance mismatch results in substantial reflection and attenuation of the modulation signal and requires the use of a high power modulation signal generator. Furthermore, the impedance mismatch is found to render the holder impractical for use in mixing applications wherein the intermediate frequency signal is extracted through this section of coaxial line.

SUMMARY OF THE INVENTION

The present invention is directed to a slab-like holder for containing a semiconductor element. The holder is adapted for use at microwave frequencies and includes a section of transmission line that can be impedance matched to an external transmission line.

The holder is formed of a thin slab-like wafer of conductive material which contains an aperture for the semiconductor element. In normal use, the wafer is inserted in a transverse plane of a slotted waveguide so that the semiconductor element is positioned in the propagation path of the guided waves. Also, the wafer contains a slot formed therein which extends to one side of the wafer. A dielectric block is mounted in this slot and a center conductor having first and second ends is contained therein. The conductor extends through the block with its first end extending toward one side of the wafer. The second end of the conductor is electrically coupled to the semiconductor element.

The semiconductor element contained in the holder is typically a diode having two electrodes, one of which is connected to the holder. The other electrode is coupled to the second end of the center conductor. When the holder is inserted into the waveguide, the dielectric block containing the center conductor is bounded on each side by the waveguide walls. Consequently, the block and center conductor form a section of electrical slab line with the waveguide walls serving as the ground planes. As generally referred to in the microwave art, a slab transmission line comprises a single conductor mounted between two grounded planes. The characteristic impedance $z_0$ of this type of transmission line is determined by the formula $$z_0=\frac{138}{\sqrt{\epsilon}}\log_{10}\frac{4h}{\pi d}$$

wherein $\epsilon$ is the dielectric constant of the medium between ground planes, $h$ is the distance between the planes and $d$ is the diameter of the center conductor.

In the present holder, the dimension $h$ is equal to the width of the slot formed in the waveguide wall for receiving the holder. This dimension is essentially equal to the width of the holder and, therefore, the entire wafer width is utilized in the determination of the characteristic impedance of the electrical connection between the element and the external circuit. As a result of this construction, relatively thin wafers of the order of .05 inch can be impedance matched to conventional 50 ohm coaxial lines.

Further features and advantages of the invention will become more readily apparent from the following detailed description of a specific embodiment when taken in conjunction with the accompanying drawings.

DESCRIPTION OF THE PREFERRED EMBODIMENT

Figure 1:
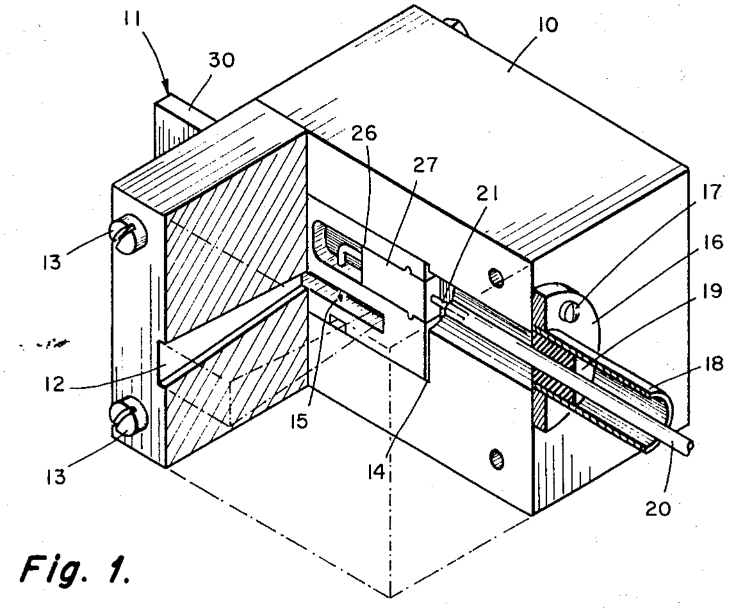
FIG. 1 is a perspective view in partial section of one embodiment of the invention.
Figure 2:
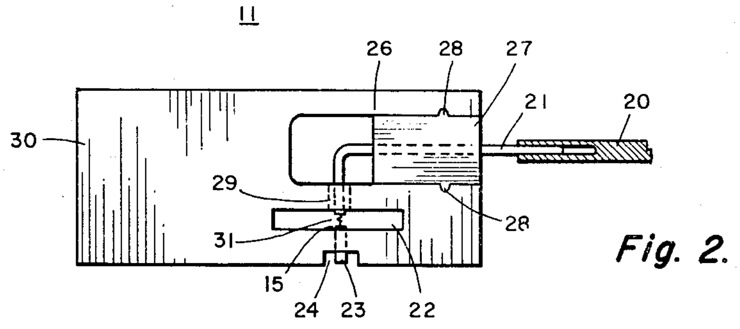
FIG. 2 is a side view of the embodiment of FIG. 1.

Referring now to FIGS. 1 and 2, a holder mount 10 is shown with the slab-like holder 11 inserted therein in a plane transverse to the direction of propagation of electromagnetic energy. Holder mounts of this type are commercially available and are normally formed of a conductive material such as brass or copper.

A waveguide channel 12 of rectangular cross-section extends to the center of mount 10 where it is intersected by a transversely extending opening 14 which, in operation, contains holder 11. The waveguide 12 continues through the mount and may be either terminated by a tuning element or coupled to a section of waveguide.

The waveguide channel 12 is shown with its height tapering from a maximum near the entrance to a minimum dimension at the transverse opening 14. As a result, the density of the electric field within the waveguide is increased. In addition, tapering the waveguide channel reduces the length of the portion of the electrical lead to the semiconductor element that is located within the aperture and, thus, minimizes the lead inductance. However, the channel can be of uniform height in other embodiments.

A coaxial connection 16 is attached to the side of the mount by fastener 17. The coaxial connection comprises outer conductor 18 electrically connected to the mount and center conductor 20 insulated therefrom by dielectric plug 19. The end of center conductor 20 extends inwardly into traverse opening 14 to provide a slidable electrical contact with the end of conductor 21 which extends outwardly from the edge of holder 11.

Figure 3:
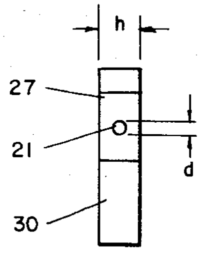
FIG. 3 is an end view of the embodiment of FIG. 1.

The constructional features of holder 11 are shown more clearly in FIGS. 2 and 3. The holder comprises a slab-like wafer 30 of conductive material, such as brass or copper, having a height only slightly less than the height of transverse opening 14 to facilitate insertion of the holder therein. To provide a good electrical and mechanical fit, the thickness $h$ of the wafer can be made slightly larger than the width of opening 14; when inserted, bolts 13 are first loosened and then retightened to insure a good contact. The length of holder 11 is selected to be greater than the width of mount 10 to permit the holder to be readily withdrawn.

Wafer 30 contains an aperture 22 in which the semiconductor element 15 is contained. The height of the aperture is substantially equal to the height of the waveguide channel 12. However, the length of the aperture is chosen to exceed the width of channel 12 for reasons which will later be explained. The aperture is located in the wafer 30 so that when the holder is inserted into the mount, the aperture is essentially in alignment with the waveguide channel and constitutes a connecting channel.

A semiconductor element 15 is mounted within aperture 22. One method of effecting the mounting consists of fastening element 15 on the end of conductive rod 23 and inserting rod 23 into a mated hole provided at the top of slot 24 until the element is located in the aperture. The rod is normally soldered in place to provide good electrical contact and mechanical support. Thus, one electrode of element 15 is electrically coupled to the holder and, therefore, to the mount. It shall be noted that many other ways of mounting element 15 in the holder may be employed.

A slot 26 is formed in the wafer 30. The slot extends through the wafer in a direction normal to the plane of the drawing and, in addition, extends outwardly to one side of the wafer. The slot is located in the wafer so that, when the holder is inserted in the mount, the center conductor 20 is substantially aligned with the center of the slot.

A dielectric block 27 formed of "Teflon," polystyrene, or the like is mounted in slot 26. The width of block 27 is equal to the thickness of the wafer 11. While the block is shown held in slot 26 by protruding members 28, the block may be held in place by epoxy cement and the like. A conductor 21 having a diameter $d$ extends through the center of block 27. The first end of this center conductor extends outwardly from the edge of wafer 11. When the holder is inserted in the mount 10, the conductor 21 slidably engages center conductor 20.

The second end of conductor 21 extends out of the opposing end of block 27 and is electrically coupled to semiconductor element 15. As shown in FIG. 2, the conductor 21 extends downwardly through communicating passage 29 and contacts the top or second electrode of the semiconductor element 15 by means of a thin wire or cat whisker 31.

The conductor 21 is insulated from wafer 30 as it passes through communicating passage 29 by a sleeve of dielectric material contained therein. While conductor 21 is shown as a single element having a 90-degree bend therein, the assembly of the holder is facilitated by utilizing two conductors and joining them at an appropriate point by solder.

The holder inserted in the slotted waveguide mount 11 is shown in FIG. 1. In operation, electromagnetic waves propagate along waveguide 12 and through aperture 22 where they are acted upon by semiconductor element 15. Since the length of aperture 22 exceeds the width of channel 12, the holder can be moved transversely to position the element 15 at a desired location in the waveguide channel 12. As known, the impedance of a waveguide varies across the wide dimension thereof and by moving the holder in the slot an impedance match between the semiconductor element and the waveguide is facilitated. Further tuning can be provided by incorporating a reactive tuning element in the mount if desired.

When the holder is inserted in the waveguide mount, portions of aperture 22 extend beyond the waveguide channel walls. As mentioned previously, the thickness $h$ of wafer 30 is less than one-half wavelength at the frequency of the electromagnetic waves propagating therein. Consequently, the cavities formed by these portions of aperture 22 are beyond cut off and any energy loss therein is negligible.

The section of conductor 21 within passage 29 is less than one-fourth wavelength at the frequency of the energy in the waveguide channel. This section constitutes a low impedance section of coaxial line which in effect appears as a bypass capacitor to the high frequency in the waveguide channel.

The characteristic impedance of the section of transmission line formed by the portion of conductor 21 passing through dielectric block 27 is the impedance presented to the external coaxial line. The closeness of the impedance match between the external line and the holder primarily determines the reflections and attenuation of a signal extracted from or applied to element 15. The combination of the conductor 21 and the dielectric block 27 constitute a section of slab line when the holder is inserted into the waveguide mount. The adjacent side-walls of the transverse opening 14 in the mount serve as the ground planes for the slab line. The impedance of the slab line is determined primarily by the ratio of the distance between the ground planes, i.e. the wafer thickness $h$, divided by the diameter $d$ of center conductor 21 in accordance with the formula previously set forth. Since this formula includes the entire thickness $h$ of the wafer 30, it is possible to impedance match the holder with conventional 50 ohm coaxial line even when the frequency of interest is within the M or E frequency bands. For example, a waveguide frequency of 70 gHz. requires that the thickness of the wafer be less than 0.610 inch and, in practice, the wafer thickness is made a fraction of the maximum to reduce energy loss from the waveguide. In one embodiment constructed for operation at 70 gHz., the impedance of the slab line was 50 ohms, the wafer thickness was 0.061 inch and the diameter of the center conductor was 0.02 inch. Thus, the required impedance match was obtained with parts of readily manufacturable size.

In contradistinction, previous devices utilized a section of coaxial line in the holder and due to the thickness limitation of the wafer were unable to provide an impedance match with the external circuit. As a result, the modulation signal source was required to provide large amplitude signals and when a mixing operation was performed, the extracted signal was not readily detectable.

Figure 4:
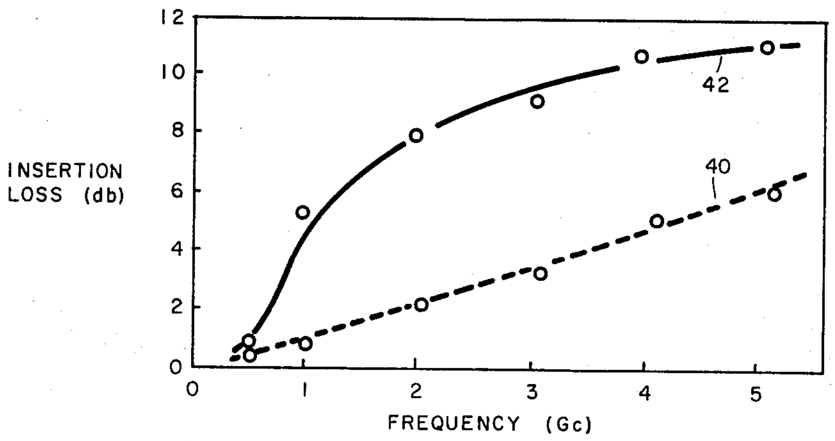
FIGS. 4 and 5 are graphs showing the variation in insertion loss and voltage standing-wave ratio, VSWR, as a function of frequency for both the embodiment of FIG. 1 and a representative prior art device.
Figure 5:
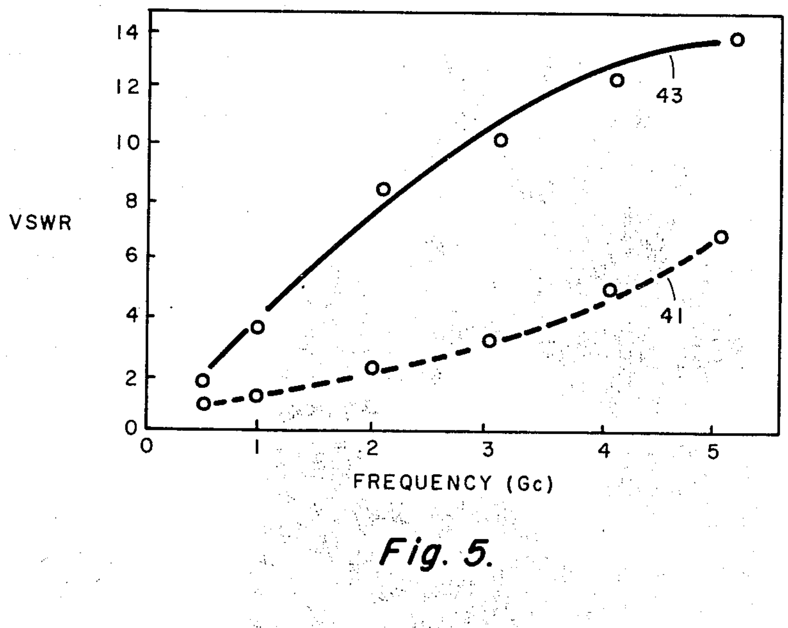

The improved operating characteristics of the present invention are shown in FIGS. 4 and 5 wherein the dashed curves 40 and 41 refer to tests performed with the present holder having the dimensions previously set forth. The solid curves 42 and 43 refer to tests performed with a holder of equal dimensions but incorporating a coaxial section therein. FIG. 4 shows the insertion loss in decibels as a function of modulating signal frequency while FIG. 5 shows the voltage standing wave ratio as a function of frequency. The improved performance of the present invention is readily seen from the curves of FIGS. 4 and 5.

While the above description has referred to a specific embodiment of the invention, it is apparent that many variations and modifications may be made therein without departing from the spirit and scope of the invention.

What is claimed is:

1. Apparatus for positioning a semiconductor element in a transverse plane of a waveguide comprising:

(a) a section of waveguide of given cross-sectional dimensions having a transverse opening therein for receiving a holder (b) a holder which comprises (1) a slab-like wafer of conductive material having a thickness which is less than one-half wavelength at the frequency of the energy in said waveguide, (2) an aperture formed on said wafer and having cross-sectional dimensions which are at least as large as the cross-sectional dimensions of said waveguide, (3) a slot formed in said wafer and extending to one side thereof, (4) a dielectric block mounted in said slot, the thickness of said block being equal to the width of said slab-like wafer, (5) a conductor having first and second ends and extending through said block, the first end of said conductor extending to said one side of the wafer, the combination of said conductor, said block and the adjacent walls of said waveguide forming a section of slab transmission line, the characteristic impedance at the first end of said conductor being determined by the diameter of said conductor and the width of said block, (6) means for coupling the second end of said conductor to a semiconductor element contained in said aperture, and (c) external coupling means attached to said waveguide for electrically coupling said conductor to an external transmission line.

2. Apparatus in accordance with claim 1 in which said first end of the conductor extends outwardly from said one side of the wafer, and in which said external coupling means comprises a coaxial connection having a center conductor adapted to slidably engage said first end.

3. A holder for a semiconductor element, said holder being adapted for insertion into a waveguide of given cross-sectional dimensions, comprising:

(a) a slab-like wafer of conductive material;

(b) an aperture formed in said wafer for containing the semiconductor element;

(c) a slot formed in said wafer, said slot extending to one side of said wafer;

(d) a dielectric block mounted in said slot, the thickness of said block being equal to the width of said slab-like wafer;

(e) a conductor having first and second ends, said conductor being centrally located within the area of said block adjacent said one side of the wafer and extending through said block, the first end of said conductor extending to said one side of the wafer, the characteristic impedance appearing at the first end of said conductor being determined by the diameter of said conductor and the width of said block; and (f) means for coupling the second end of said conductor to a semiconductor element contained in said aperture.

4. The holder in accordance with claim 3 in which said aperture has cross-sectional dimensions which are at least as large as the cross-sectional dimensions of said waveguide.

5. The holder in accordance with claim 4 in which said slab-like wafer has a thickness which is less than one-half wavelength at the frequency of the electromagnetic waves propagating in said waveguide.

6. The holder in accordance with claim 5 further comprising a semiconductor element mounted in said aperture, said element having first and second electrodes, said first electrode being coupled to said wafer and said second electrode being coupled by said means to the second end of said conductor.

7. Apparatus for positioning a semiconductor element in a transverse plane of a waveguide comprising:

(a) a section of waveguide of given cross-sectional dimensions having a transverse opening therein for receiving a holder, (b) a holder which comprises (1) a slab-like wafer of conductive material having a thickness which is less than one-half wavelength at the frequency of the energy in said waveguide, (2) an aperture formed on said wafer and having cross-sectional dimensions which are at least as large as the cross-sectional dimensions of said waveguide, (3) a slot formed in said wafer and extending to one side thereof, (4) a dielectric block mounted in said slot, (5) a conductor having first and second ends and extending through said block, the first end of said conductor extending outwardly from said one side of the wafer, the combination of said conductor, said block and the adjacent walls of said waveguide forming a section of slab transmission line, (6) means for coupling the second end of said conductor to a semiconductor element contained in said aperture, and (c) external coupling means attached to said waveguide for electrically coupling said conductor to an external transmission line, said external coupling means comprising a coaxial connection having a center conductor adapted to slidably engage said first end, the characteristic impedance of the section of slab transmission line formed by said conductor, said block, and the adjacent waveguide walls being equal to the characteristic impedance of said coaxial connection.

References Cited

UNITED STATES PATENTS

| | | | |
|---|---|---|---|
| 2,871,353 | 1/1959 | Friis et al. | 329—161 X |
| 3,231,838 | 1/1966 | Sharpless | 325—445 X |

JOHN KOMINSKI, Primary Examiner

L. J. DAHL, Assistant Examiner

U.S. Cl. X.R.

333—98